Figure 1:
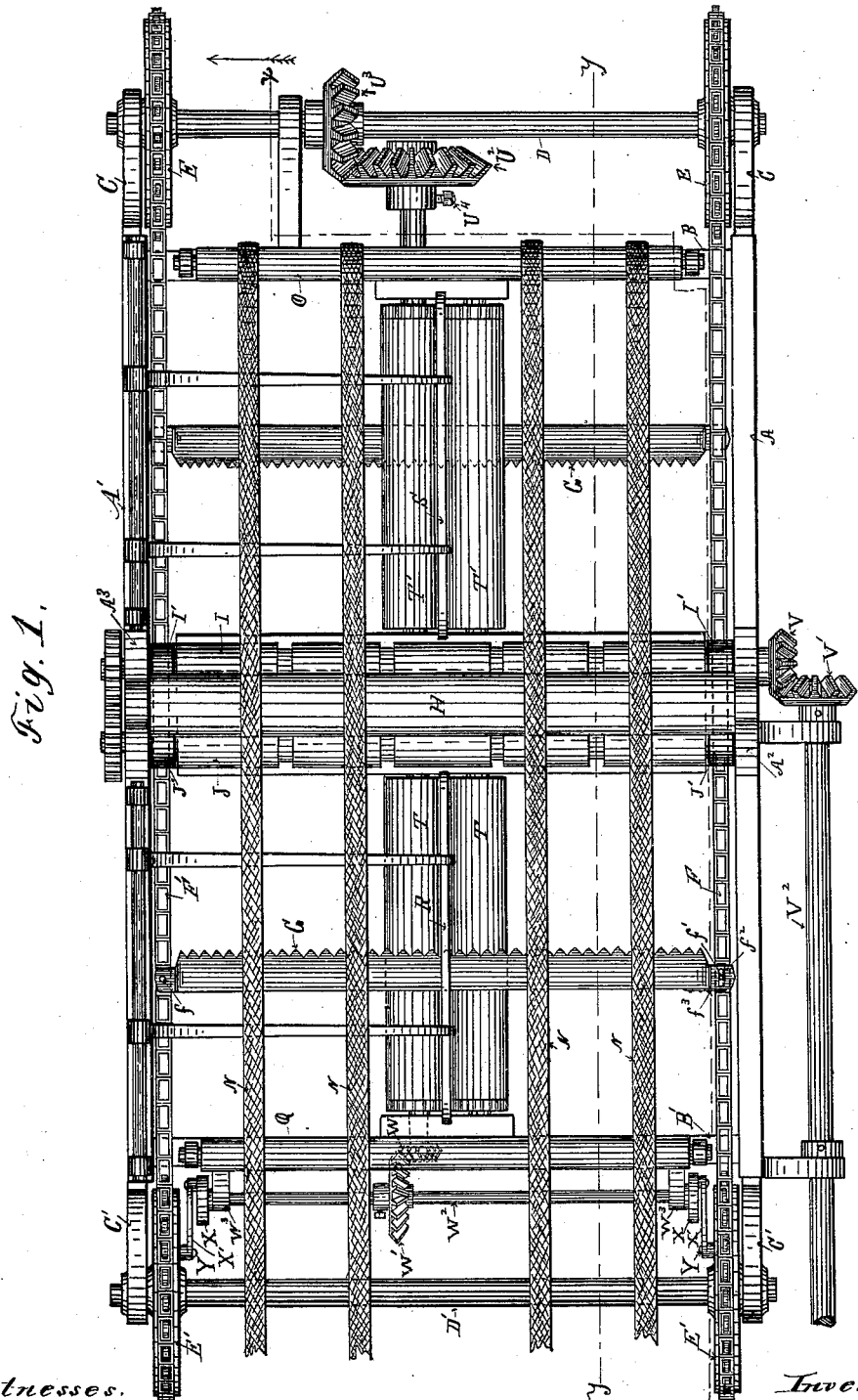

(No Model.) 6 Sheets—Sheet 1.

J. H. STONEMETZ.
COMBINED PAPER CUTTING AND FOLDING MACHINE.

No. 376,052. Patented Jan. 3, 1888.

Witnesses.
H. M. Sturgeon
John S. Rieling

Inventor.
John H. Stonemetz
By H. Sturgeon
Atty.

(No Model.) 6 Sheets—Sheet 2.
J. H. STONEMETZ.
COMBINED PAPER CUTTING AND FOLDING MACHINE.
No. 376,052. Patented Jan. 3, 1888.
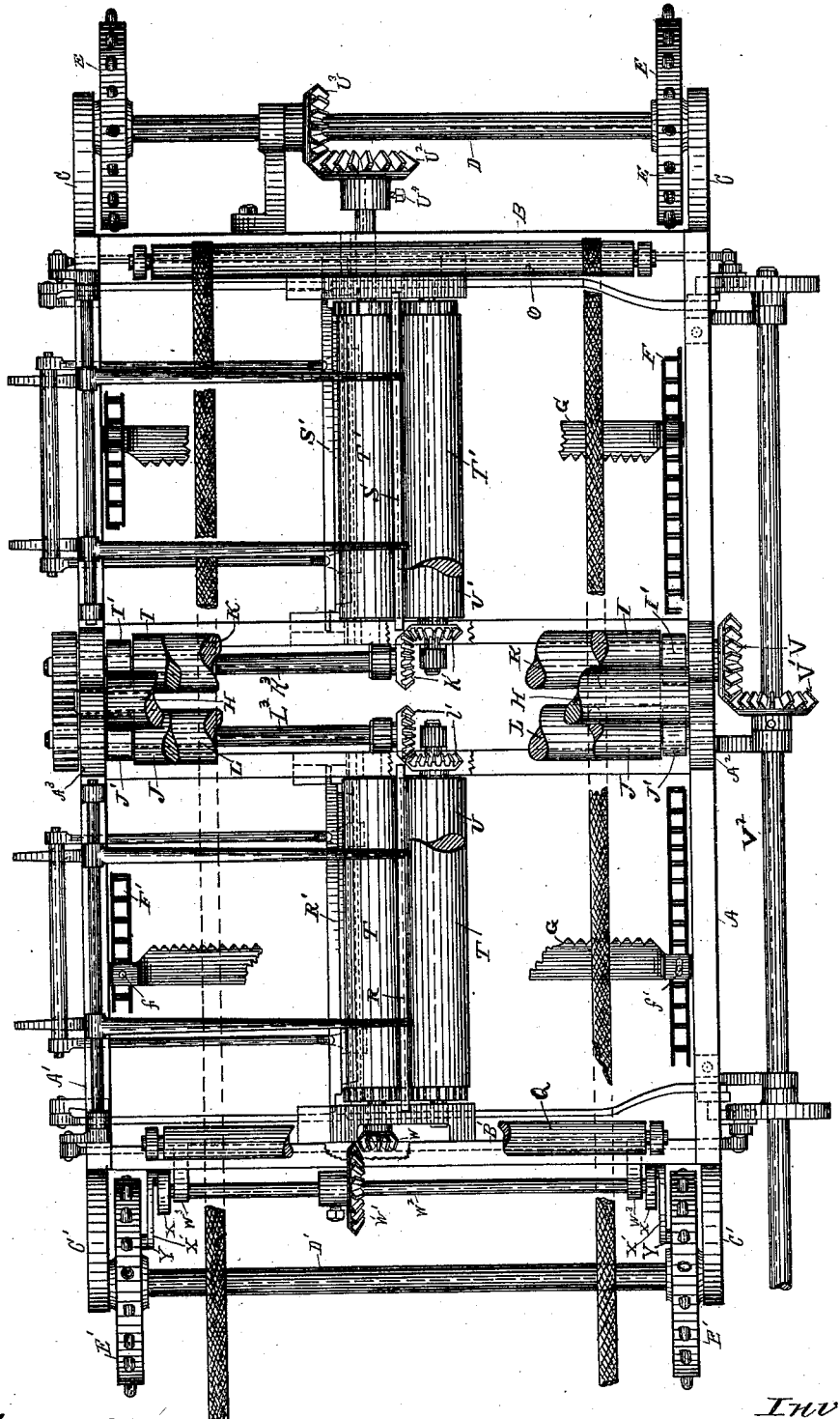

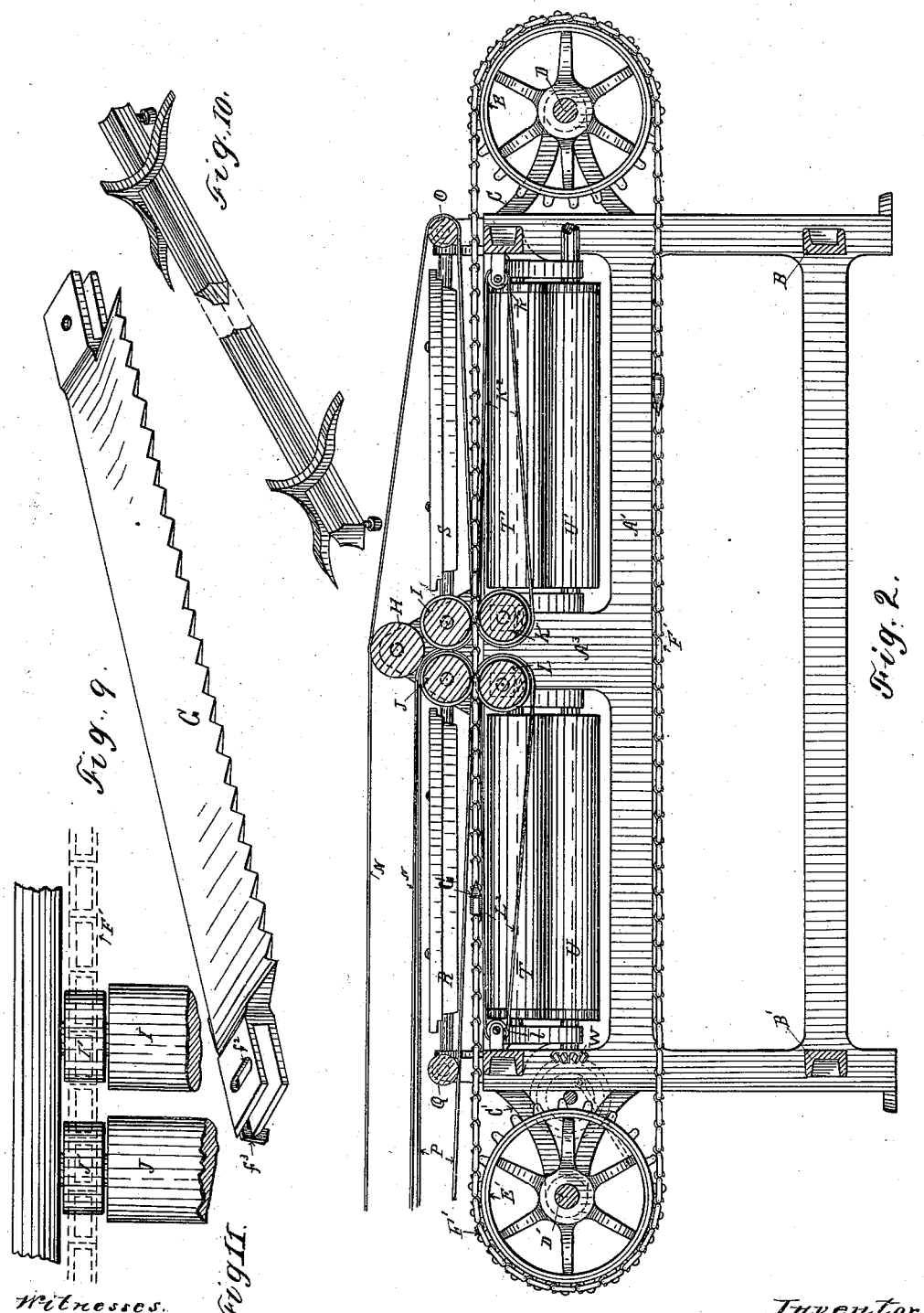

(No Model.)  6 Sheets—Sheet 4.
J. H. STONEMETZ.
COMBINED PAPER CUTTING AND FOLDING MACHINE.
No. 376,052. Patented Jan. 3, 1888.
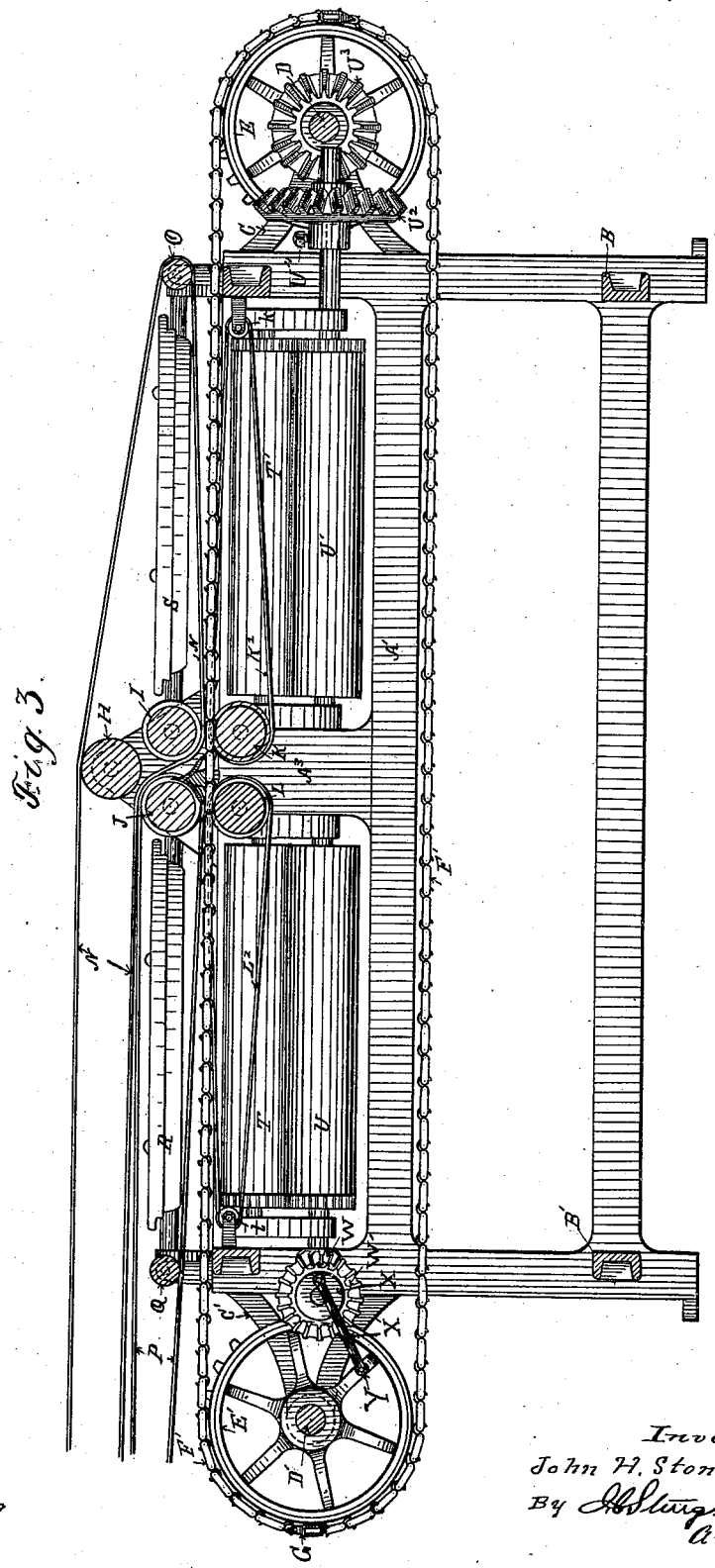
Witnesses.
Inventor.
John H. Stonemetz

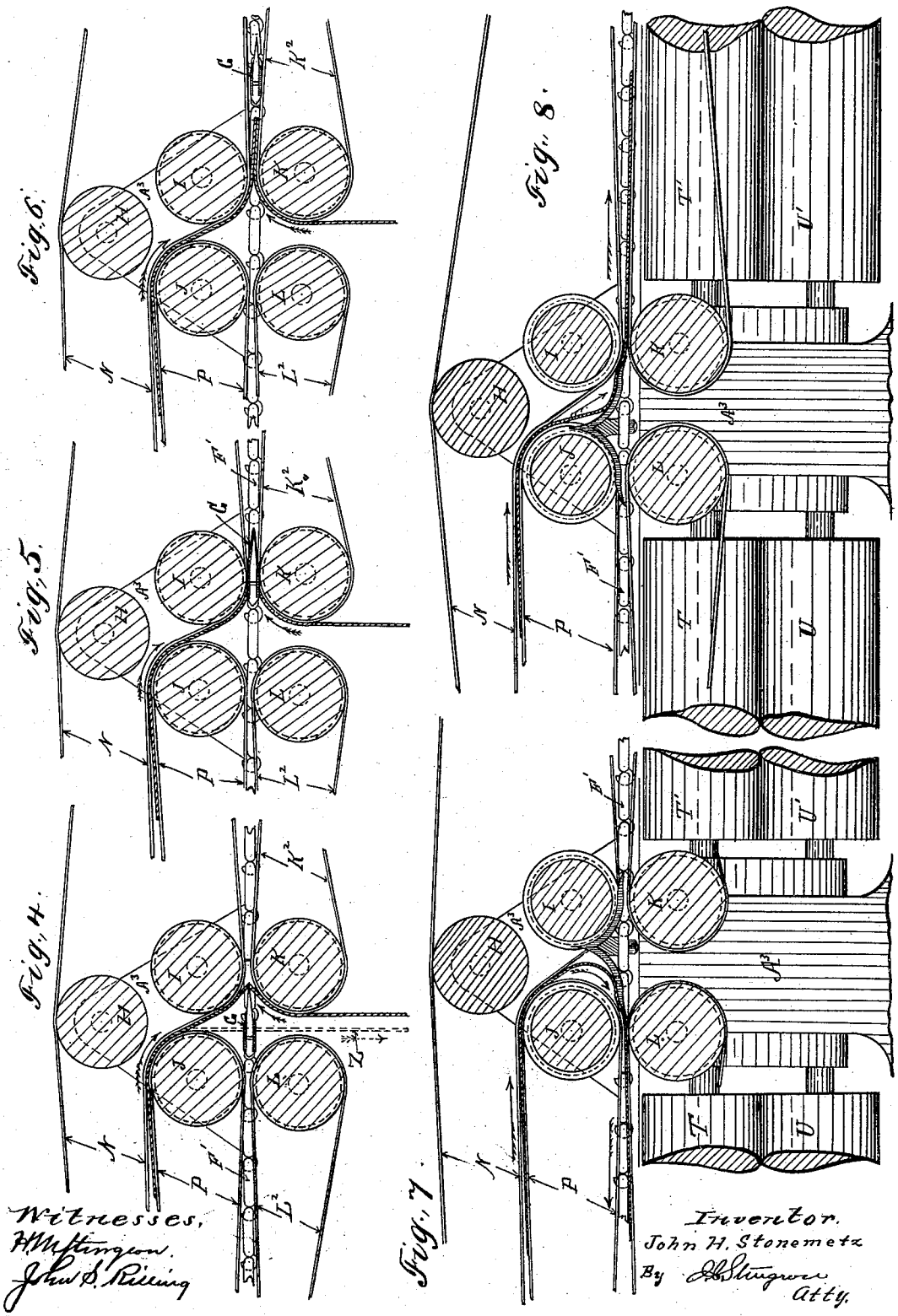

(No Model.)
6 Sheets—Sheet 6.
J. H. STONEMETZ.
COMBINED PAPER CUTTING AND FOLDING MACHINE.
No. 376,052. Patented Jan. 3, 1888.
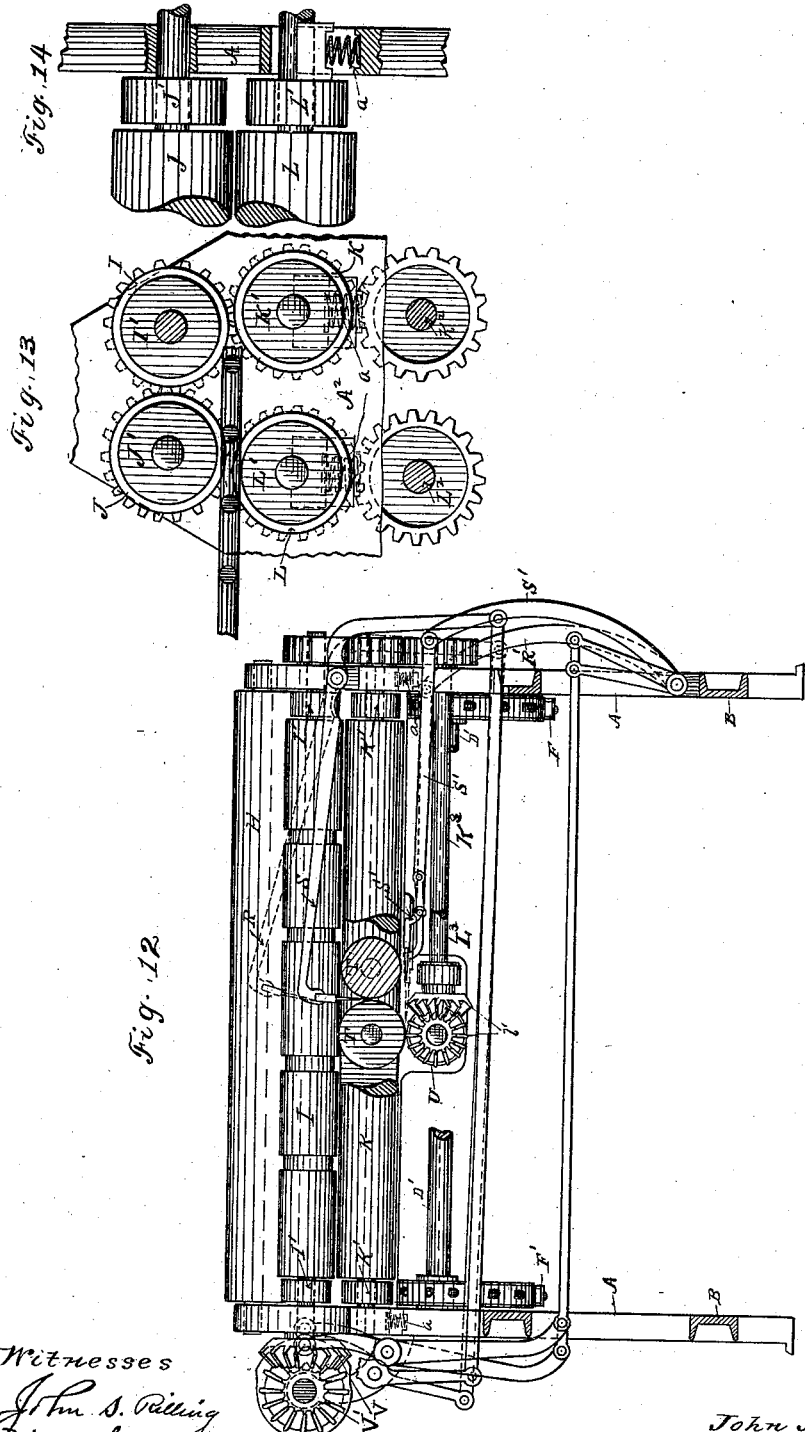

UNITED STATES PATENT OFFICE.

JOHN H. STONEMETZ, OF ERIE, PENNSYLVANIA, ASSIGNOR TO THE STONE-METZ PRINTER'S MACHINERY COMPANY, OF MILLBURY, MASSACHUSETTS.

COMBINED PAPER CUTTING AND FOLDING MACHINE.

SPECIFICATION forming part of Letters Patent No. 376,052, dated January 3, 1888.

Application filed January 2, 1886. Serial No. 187,369. (No model.)

*To all whom it may concern:*

Be it known that I, JOHN H. STONEMETZ, a citizen of the United States, residing at Erie, in the county of Erie and State of Pennsylvania, have invented certain new and useful Improvements in Combined Paper Cutting and Folding Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to paper-folding machines; and it consists in the improvements hereinafter set forth and explained.

My invention is illustrated in the accompanying drawings, in which—

Figure 1 is a top or plan view of my improved paper-folding machine. Fig. 1½ is a top or plan view of my improved machine with the cross-rolls broken away, showing the mechanism for driving the folding-rolls, and also showing the horizontal and vertical folding-blades of the machine. Fig. 2 is a vertical longitudinal section of same on the line $xx$ in Fig. 1. Fig. 3 is a vertical longitudinal section of same on line $yy$ in Fig. 1. Figs. 4, 5, and 6 are vertical longitudinal sections showing the five central rollers of the machine and the sheet-cutting knife in various positions in their transit through the folder. Figs. 7 and 8 are like views of the central rollers, showing the operation of my improved sheet-deflecting device. Fig. 9 is a perspective view of my improved cutting-knife detached from the folding-machine. Fig. 10 is a perspective view of my improved sheet-deflecting device, the central portion thereof being broken away. Fig. 11 is a top or plan view of one end of two of the central folding-rolls, showing the chain-spools on the ends of the rolls. Fig. 12 shows a cross-section of my machine, illustrating *inter alia* the folding-blade connections. Fig. 13 shows an end view of the four lower cross rolls with the supporting-frame broken away, showing the chain-spools thereon. Fig. 14 is a detail side elevation, with parts in section, of one end of the lower cross-rolls, showing the chain-spools and the yielding bearings under the ends of the lower rolls.

Like letters refer to like parts in all the figures.

My improved paper-folding machine is so constructed that it is adapted to cut and fold large sheets as they come from the printing-press by cutting and folding the same together at one operation—for example, cutting and folding an eight-page paper; or, where it is desired to fold ordinary four-page papers, the machine can be quickly and easily adjusted to operate as a double folder, alternately taking a sheet and folding it at each end of the machine, thus enabling it to do double the work of an ordinary folding-machine.

My machine also embodies the feature of being adapted to connect directly to a printing-press and of operating in conjunction therewith.

In the construction of my improved paper-folding machine, A A' are the side frames and B B' the end frames thereof, these end frames, B B', being provided with brackets C C and C' C', in which I mount shafts D and D', having thereon sprocket-wheels E E and E' E', around which wheels E and E' run sprocket-chains F F'. Extending from the chain F to the chain F' is a serrated paper-cutter, G, the ends of the cutter G being constructed substantially as shown in Fig. 9, so as to slip over a link of each chain, and are fastened to the chains F F' by means of rivets $ff'$.

In one end of the cutter G the opening for the rivet $f'$ is slotted at $f^2$ and provided with a spring, $f^3$, which is connected to the rivet $f'$ in such a manner that a slight backward and forward movement of the cutter G is permitted upon the rivet $f'$, the purpose whereof will be hereinafter explained.

The central portions, $A^2$ and $A^3$, of the frames A and A' are provided with five rollers, H, I, J, K, and L, these rollers H I J K L being geared together and extending across the machine. The lower four of said rollers, I, J, K, and L, are provided on their ends with chain-spools I' J' K' L', (an enlarged view of which is shown in Figs. 11, 13, and 14.) Between these spools the chains F and F' run. The rollers H, I, and J are mounted in fixed bearings in the frames $A^2$ and $A^3$ of the machine, while the rollers K and L are mounted in movable boxes set in the portions $A^2$ and $A^3$ of the frame upon springs $a$ $a$, as shown in Figs. 12, 13, and 14, so that they will move up and down, as and for the purpose hereinafter set forth. The cross-rolls I, J, K, and L are connected together by means of spur-gearing, (the roller H being driven by frictional contact with the carrier-tapes.) These rollers are driven by means of a miter-gear, V, on the journal of the roll I, which intermeshes with a like gear, V', on a driving-shaft, $V^2$, adapted to connect with a printing-press or other motive power. Below the rolls L and K, and geared thereto, are cross-shafts $L^3$ and $K^3$, the cross-shaft $L^3$ connecting with and driving the roll U by means of miter-gears $i$, (the rolls T T being geared to U.) In like manner, by means of miter-gears $k'$, the cross-shaft $K^3$ drives the rolls U' T' T'. The vertical folding-blades R S and the horizontal folding-blades R' S' are operated by ordinary cam-and-lever mechanism, there being nothing novel in their arrangement or operation.

Carrier-tapes adapted to run from a printing-press pass over the roller J and under the roller I to and around a tape-roller, O, on the top of the end frame B and back over the roller H to the press, and carrier-tapes P, adapted to run from a printing-press, pass around the roller J and back under a tape-roller, Q, on the top of the end frame B' to the press, these tapes being adapted to carry sheets between them from the press, as illustrated in Figs. 4, 5, 6, 7, and 8, to and over the roller J, which operates as the sheet-receiving roller of the machine. Carrier-tapes $L^2$ and $K^2$ also pass around the rollers L and K, extending to and around tape-spools $l$ on the frame B' and $k$ on the frame B of the machine.

In the construction shown, on each side of the central section, $A^2$ $A^3$, of the frame are located vertical folding-blades R and S, horizontal folding-blades R' and S', and folding-rolls T T U and T' T' U', of ordinary construction, there being three folding-rolls on each side, so arranged as to make two folds in the sheet. However, any number of folding-rolls and folding-blades may be used, according to the number of folds desired.

On the journal of the folding-roll U' is a miter-gear, $U^2$, which intermeshes with a like gear-wheel, $U^3$, on the shaft D, the gear-wheel $U^2$ being secured in place by a set-screw, $U^4$, so that the wheel $U^2$ may be moved back out of mesh, for the purpose hereinafter set forth, when desired. On the end of the shaft of the folding-roll U is also a bevel-gear pinion, W, which intermeshes with a bevel-gear, W', on a cross-shaft, $W^2$, this shaft being mounted in bearings $W^3$ on the end frame B'. On each end of this shaft $W^2$ are crank-disks X X, from which disks are pitmen X' X', which connect with crank-pins Y Y on the sprocket-wheels E' E', as and for the purpose hereinafter specified.

In Fig. 10 I show a sheet-deflecting device, which is adapted to be attached to the chains F F' between the rollers I and J, as illustrated in Figs. 3, 7, and 8, the purpose and object whereof will be hereinafter explained. I have not shown a pasting device in this construction; but any ordinary pasting device may be readily attached thereto and used thereon.

In operating my improved folder the driving-shaft $V^2$ is connected by suitable attachments with a printing-press, and the carrier-tapes N and P run over suitable rollers on the press, so as to receive the printed sheets therefrom and carry them directly into the folder over the cross-roller J, and when it is desired to cut and fold an eight-page sheet the sheet is carried by the carrier-tapes N and P between the cross rollers H and J, and after passing said rollers it runs downward in the direction of the arrow, as shown by the dotted line $z$ in Fig. 4, until the edge of the cutting-knife G in its passage strikes the center of the sheet and carries it between the rollers I and K, forming the first fold therein, as shown in Fig. 5. The knife G is arranged to travel somewhat faster than the periphery of the rolls I and K. The ends of the knife G being thicker than the cutting portion of the blade, in passing between the spools I' and K' on the ends of the rolls I and K, depress the roll K in its movable bearings in the frame $A^2$ $A^3$, so that the knife carries the sheet with it without the rolls I and K acting upon the sheet until the knife G passes them, when, by the action of the springs under the bearings of the roller K, it is instantly raised up to the rollers I, compressing the once-folded sheet between them, as shown in Fig. 6, and as the peripheries of the rollers I and K move at a less rate of speed than the knife G, the movement of the folded sheet is somewhat retarded as it is being carried onward by the rollers I and K, which causes the knife G to cut its way out, it being better enabled to do this by the movement of one end thereof by means of the slot $f^2$ therein, which gives it a slight sawing motion on the sheet, leaving the sheet cut in two parts, one on top of the other, these two parts of the sheet passing along between the rollers I and K and the carrier-tapes N and $K^2$ under the folding-blade S, by which they are tucked between the folding-rolls T' T', from whence they pass on through the folder, the cutting-blade G being meanwhile carried around under the machine by the sprocket-chains to which it is attached, as shown in Fig. 1, and back over the machine in time to meet the next sheet. When, however, it is desired to rapidly fold single sheets without cutting, the bevel-gear $U^2$ is moved back out of mesh with the gear $U^3$ and the pitmen X' X' connected with the crank-pins Y Y on the sprocket-wheels E' E', and the deflector, Fig. 10, attached to the sprocket-chains F F' between the rollers K and L by means of set-screws. The action of the crank-disks X X and their connecting-pitmen X' X' on the sprocket-wheels E' E' causes them to oscillate, thus producing a slight movement forward and backward of the chains F F', moving the deflector, Fig. 10, alternately against the rollers K and L and deflecting the sheets passing into the folder, as shown in Figs. 7 and 8, so that alternately one sheet passes between the rolls J and L to and under the folding-blade R and between the folding-rolls T T and U and the next sheet between the rolls I and K to and under the folding-blade S and between the folding-rolls T' T' and U', thus enabling the machine to do very rapid work, it accomplishing the work of two ordinary folders.

Having thus fully described my invention so as to enable others skilled in the art to which it appertains to construct and use the same, what I claim as new, and desire to secure by Letters Patent of the United States, is—

1. The combination, in a paper-folding machine, of a sheet-receiving roller and folding-rollers parallel thereto, with sheet folding and cutting blades passing between the folding-rolls, substantially as and for the purpose set forth.

2. The combination, in a paper-folding machine, of a sheet-receiving roller and folding-rollers parallel thereto, one of said folding-rolls having yielding bearings, with a traveling sheet folding and cutting blade adapted to operate between the said folding-rollers, substantially as and for the purpose set forth.

3. The combination, in a paper-folding machine, of a sheet-receiving roller and folding-rollers parallel thereto, and sheet-conveying tapes for conveying sheets thereto, with sheet folding and cutting blades traveling between said folding rollers in one direction and back under them in the other, substantially as and for the purpose set forth.

4. The combination in a paper-folding machine, of a sheet-receiving roller and carrier-tapes adapted to convey sheets thereto, and folding-rollers parallel to said receiving-rollers, with a folding and cutting blade traveling between said folding-rollers and carrier-tapes, folding-blades, and folding-rolls adapted to receive a doubled and cut sheet from the first folding-rollers and fold the same, substantially as set forth.

5. The combination, in a paper-folding machine, of two complete sets of folding-roll and folding-blade mechanism, one set at each end of the machine, with rollers J L and I K, arranged across the central portion of the machine, and sprocket-chains carrying a sheet-deflector and traveling back and forth between chain-spools at the ends of the rollers J L and I K, substantially as and for the purpose set forth.

6. The combination in a paper-folding machine, of the cross-rollers H, J, I, and K, and the chain-spools I', J', L', and K', with the sprocket-chains F F', the blades G thereon, the folding-rolls T' T' U', the folding-blades S and S', and the carrier-tapes N, P, and K², all substantially as and for the purpose set forth.

7. The combination, in a paper-folding machine, with the cross-rollers H I K and J L, the chain-spools I', J', K', and L', and the sprocket-chains F F', of the deflector, Fig. 10, the folding-rolls T T U and folding-blades R and R', and the folding-rolls T' T' U', and folding-blades S S', substantially as and for the purpose set forth.

8. The combination, in a paper-folding machine, of two complete sets of sheet-conveyer tapes, folding-blades, and folding-rolls, and a series of rollers provided with conveyer-tapes located between the two folding mechanisms, with endless sprocket-chains operating between loose chain-spools on the ends of said series of rollers and over sprocket-wheels at either end of the machine, and a folding and cutting blade, and a detachable vibratory sheet-deflector adapted to be attached to said sprocket-chains between said rollers, the machine being thereby adapted for either cutting and folding a double sheet or for folding two single sheets at the same time, substantially as set forth.

In testimony whereof I affix my signature in presence of two witnesses.

JOHN H. STONEMETZ.

Witnesses:
JOHN S. RILLING,
F. W. GRANT.